3,304,256
SPARKING COMPOSITION
Leandro W. Tomarkin, Spring Valley, N.Y.
(P.O. Box 393, Monsey, N.Y. 10952)
No Drawing. Filed Oct. 30, 1963, Ser. No. 320,000
11 Claims. (Cl. 252—1)

This invention relates to a sparking composition, and more particularly concerns a composition in granular or solid form which is adapted to give off visible sparks upon being subjected to frictional action.

Certain materials, known as triboluminescent phosphors have the property of giving off light in spark form when such materials are subjected to a rubbing action. These phosphors are essentially activated zinc sulfides which contain small amounts of manganese and copper as the activating agents.

An object of this invention is to provide such triboluminescent phosphors in a form which will produce an amplified sparking action upon being subjected to frictional action.

Another object of this invention is to provide a composition including a triboluminscent phosphor in powdered form and hard transparent spherical bodies such as glass beads admixed therewith, such composition in either granular or aggregated form being adapted to produce enhanced sparking when subjected to frictional action.

A further object of this invention is to provide improved toys and signalling devices which are of relatively simple construction and include an improved sparking composition adapted to be subjected to frictional action to thereby produce visible sparks in amplified form.

Other objects of this invention will in part be obvious and in part hereinafter pointed out.

Essentially, the sparking composition of the instant invention comprises a triboluminescent phosphor in finely divided form which is admixed with glass beads. The composition may take the form of a free flowing granular product, in which case the glass beads are of uniform selected diameter; or in the form of a solid body, sheet or coating, in which case the powder and beads are aggregated by a suitable binder.

The triboluminescent phosphor is prepared in a known manner from zinc sulfide having little or no cadmium sulfide content. The zinc sulfide is admixed with small amounts of manganese and copper, together with a flux of magnesium or sodium chloride. The manganese is deemed a primary activator and may be present in amounts of from 0.1 to 3.0%, preferably 0.5%, by weight of the zinc sulfide. A secondary activator such as copper in an amount not exceeding 0.03% by weight of the zinc sulfide may be optionally added. The flux of magnesium or sodium chloride is added in amounts of from 1 to 20%, preferably about 4% by weight of the zinc sulfide.

The mixture of zinc sulfide, activator and flux is roasted in a silica container at a neutral or slightly oxidizing atmosphere at a temperature of from 850 to 1300° C., preferably at about 1100° C. The roasted mixture is cooled and powdered to form particles having an average diameter of from about 3 to about 40 microns, preferably about 12 microns.

The sparkling composition, in granular free flowing form is produced by mixing from 10 to 25 parts of the powdered phosphor with from 90 to 75 parts of flint glass beads of a uniform, selected diameter. The beads may have a diameter of from about 200 to about 800 microns.

Thus, a granular composition was made by mixing 20 parts by weight of the triboluminescent phosphor in powdered form with 80 parts by weight of glass beads having a diameter of 800 microns. When such granular composition was introduced between the opposed surfaces of a pair of relatively movable bodies in close proximity to each other and the bodies were moved relative to each other to produce a frictional action on the composition, sparks in amplified brilliance were clearly perceptible through one of the bodies which was of a transparent character. One of the bodies had a hardness of at least 40 Shore A and the other body was somewhat harder.

On using glass beads of lesser diameters approaching 200 microns, the sparking effect was further enhanced by the increase in total surface area of the beads in a given volume of the composition.

The composition may also be used in aggregated form by adding a settable binder having a hardness of from about 35 Shore D to about 85 Shore D, to the triboluminescent phosphor and glass beads, to form sticks, sheets, coating and the like. Various binders may be used including waxes, shellac, inorganic cement and the like. The proportion of binder to the phosphor and glass beads may be varied to suit the end use of the composition.

Thus, paraffin wax was mixed with carnauba wax in the proportion of 90% of the former and 10% of the latter, by weight to provide a wax binder having a melting point of 80° C. The wax binder was melted and powdered phosphor and glass beads having a diameter of about 45 microns were stirred into the molten binder; the binder, phosphor and beads being in equal parts by volume.

The mixture was allowed to cool slowly with continued stirring to insure a uniform distribution of the phosphor and beads through the binder. The cooled mixture was then cast into sticks of suitable diameter and length. Upon rubbing the end of a stick even lightly upon a transparent body such as glass or plastic, brilliant sparks were clearly visible through the body.

Shellac is also a suitable binder and a composition made up of 3 parts of shellac, 3 parts of phosphor and 2 parts of glass beads of 75 micron diameter, all by weight, was made up by melting the shellac and stirring in the other ingredients as described above. The resultant composition was cast into sticks.

Inorganic, settable cements such as oxychloride cements and the like, may also be used to aggregate the phosphor and glass beads. The composition including the selected binder may be cast into sheet form or may be applied as a coating to a transparent base such as glass or the like. The coating has a thickness of the order of about 1 to 2 mm. and should not exceed about 2.5 mm. Upon rubbing a hard object over the coating, sparking takes place which is clearly visible through the transparent base carrying the coating.

Aggregating binders include synthetic resins of the nonbrittle type, such as the acrylic resins, may also be used to form solid sparking compositions in the manner described above.

As various changes might be made in the embodiments of the invention herein disclosed without departing from the spirit thereof, it is understood that all matter herein described shall be deemed illustrative and not limiting except as set forth in the appended claims.

What is claimed is:
1. A composition for producing visible sparks upon being subjected to frictional action, said composition consisting essentially of a mixture of a minor proportion of powdered triboluminescent phosphor and a major proportion of glass beads.
2. A composition as in claim 1 wherein said beads have a diameter of from about 200 to about 800 microns.
3. A composition as in claim 1 wherein said beads have a diameter of from about 40 to about 90 microns.
4. A composition as in claim 1 and further including a binder for aggregating said powdered phosphor and beads.

5. A granular, free flowing composition for producing visible sparks upon being subjected to frictional action, said composition consisting essentially of from 10 to 25 parts of powdered triboluminescent phosphor and from 90 to 75 parts of glass beads.

6. A solid body for producing visible sparks upon being subjected to frictional action, said body comprising a composition consisting essentially of a powdered triboluminescent phosphor, glass beads and a binder having a hardness from about 35 Shore D to about 85 Shore D.

7. A sparking composition consisting essentially of a minor proportion of a powdered triboluminescent phosphor having a particle diameter of from about 3 to about 40 microns and a major proportion of glass beads of uniform diameter, said beads having a diameter of from about 200 to about 800 microns, said composition producing visible sparks upon being subjected to frictional action only.

8. A sparking composition consisting essentially of a minor proportion of a powdered triboluminescent phosphor and a major proportion of glass beads and a binder for aggregating said phosphor and beads, said binder comprising from 10 to 50% by weight of the composition, said composition producing visible sparks upon being subjected to frictional action only.

9. A sparking composition as in claim 8 wherein the binder is a wax.

10. A sparking device comprising a transparent base and a coating composition on said base adapted to produce sparks upon being subjected to frictional action, said composition consisting essentially of a mixture of 10 to 25 parts of a powdered triboluminescent phosphor, 90 to 75 parts of glass beads and a binder, said coating having a thickness of from about 1 mm. to about 2.5 mm.

11. A granular, free flowing sparking composition disposed between a pair of opposed, relatively movable solid bodies, one of said bodies being transparent for producing sparks upon frictional contact between said composition and said bodies upon relative movement thereof, said composition consisting essentially of a minor proportion of powdered triboluminescent phosphor and a major proportion of glass beads of uniform diameter.

References Cited by the Examiner
UNITED STATES PATENTS

| | | | |
|---|---|---|---|
| 2,959,701 | 11/1960 | Marzocchi et al. | 313—108 |
| 3,030,870 | 4/1962 | Gill | 252—301.3 |
| 3,170,884 | 2/1965 | Macklin | 252—301.3 |

HELEN M. McCARTHY, *Acting Primary Examiner.*

TOBIAS E. LEVOW, *Examiner.*

R. D. EDMONDS, *Assistant Examiner.*